United States Patent
Sarangamath

(10) Patent No.: US 9,141,887 B2
(45) Date of Patent: Sep. 22, 2015

(54) RENDERING PERMISSIONS FOR RENDERING CONTENT

(75) Inventor: Suraj Sarangamath, Bangalore Karnatka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/354,297

(22) PCT Filed: Oct. 31, 2011

(86) PCT No.: PCT/IN2011/000750
§ 371 (c)(1),
(2), (4) Date: Apr. 25, 2014

(87) PCT Pub. No.: WO2013/065056
PCT Pub. Date: May 10, 2013

(65) Prior Publication Data
US 2014/0300923 A1    Oct. 9, 2014

(51) Int. Cl.
*G06K 15/00* (2006.01)
*G06F 3/12* (2006.01)
*G06F 15/00* (2006.01)
*G06K 1/00* (2006.01)

(52) U.S. Cl.
CPC ............ *G06K 15/007* (2013.01); *G06F 3/1206* (2013.01); *G06F 3/1239* (2013.01); *G06F 3/1244* (2013.01); *G06F 3/1288* (2013.01); *G06K 15/4095* (2013.01); *G06F 3/122* (2013.01)

(58) Field of Classification Search
None
See application file for complete search history.

(56) References Cited

U.S. PATENT DOCUMENTS

| | | |
|---|---|---|
| 5,448,634 A | 9/1995 | Satomi et al. |
| 5,805,810 A | 9/1998 | Maxwell |
| 6,871,065 B2 | 3/2005 | Yamaguchi |
| 6,909,518 B2 | 6/2005 | Miller et al. |
| 6,975,419 B2 | 12/2005 | Staas et al. |
| 6,976,082 B1 | 12/2005 | Ostermann et al. |
| 7,130,807 B1 | 10/2006 | Mikurak |
| 7,143,210 B2 * | 11/2006 | Ferlitsch ......................... 710/38 |
| 7,248,859 B2 | 7/2007 | Yamaguchi |
| 7,296,058 B2 | 11/2007 | Throop |
| 7,663,652 B1 | 2/2010 | Reese |
| 7,715,041 B2 * | 5/2010 | Henke et al. ................. 358/1.18 |
| 7,831,676 B1 | 11/2010 | Nagar |
| 7,873,695 B2 | 1/2011 | Clegg et al. |
| 7,882,186 B1 | 2/2011 | Sun |

(Continued)

FOREIGN PATENT DOCUMENTS

| | | |
|---|---|---|
| CN | 1703749 A | 11/2005 |
| CN | 102073805 A | 5/2011 |

(Continued)

OTHER PUBLICATIONS

International Search Report & Written Opinion received for PCT Application No. PCT/IN2011/000750, Aug. 9, 2012, 11 pages.

(Continued)

*Primary Examiner* — Satwant Singh
(74) *Attorney, Agent, or Firm* — Hewlett-Packard Patent Department

(57) ABSTRACT

A print request is received via network connection from a registered user. Content from the print request is rendered according to the registered user's rendering permissions. The rendered content is then provided to a device associated with the registered user.

12 Claims, 3 Drawing Sheets

(56) References Cited

U.S. PATENT DOCUMENTS

| | | | |
|---|---|---|---|
| 7,886,038 B2 | 2/2011 | Ferris | |
| 7,949,755 B2 | 5/2011 | Katoh et al. | |
| 7,957,991 B2 | 6/2011 | Mikurak | |
| 7,970,843 B2 | 6/2011 | Brown et al. | |
| 8,086,687 B2 | 12/2011 | Matoba | |
| 8,150,920 B2* | 4/2012 | Forstadius | 709/205 |
| 8,179,549 B1 | 5/2012 | Evans | |
| 8,214,329 B2 | 7/2012 | Gilder et al. | |
| 8,214,335 B2 | 7/2012 | Hamilton, II et al. | |
| 8,261,295 B1 | 9/2012 | Risbood et al. | |
| 8,275,853 B2 | 9/2012 | Almeida et al. | |
| 8,306,975 B1 | 11/2012 | Eldering | |
| 8,326,814 B2 | 12/2012 | Ghods et al. | |
| 8,352,941 B1 | 1/2013 | Protopopov et al. | |
| 8,370,913 B2 | 2/2013 | Hodgkinson et al. | |
| 8,418,257 B2 | 4/2013 | Hoogerwerf et al. | |
| 8,433,765 B2 | 4/2013 | Dolin | |
| 8,448,170 B2 | 5/2013 | Wipfel et al. | |
| 8,577,957 B2 | 11/2013 | Behar et al. | |
| 8,578,076 B2 | 11/2013 | van der Linden et al. | |
| 8,589,957 B2 | 11/2013 | Paul et al. | |
| 8,593,677 B2 | 11/2013 | Nishimi et al. | |
| 8,607,137 B2 | 12/2013 | Wang | |
| 8,676,900 B2 | 3/2014 | Yruski et al. | |
| 8,699,049 B2* | 4/2014 | Sugiyama | 358/1.14 |
| 8,787,367 B2 | 7/2014 | Vendrow et al. | |
| 8,813,170 B2 | 8/2014 | Novak et al. | |
| 8,842,338 B2* | 9/2014 | Hayakawa et al. | 358/1.9 |
| 2001/0029177 A1 | 10/2001 | Yamaguchi | |
| 2004/0193717 A1 | 9/2004 | Tajima et al. | |
| 2005/0068560 A1* | 3/2005 | Ferlitsch | 358/1.13 |
| 2005/0068562 A1* | 3/2005 | Ferlitsch | 358/1.14 |
| 2005/0068564 A1* | 3/2005 | Ferlitsch | 358/1.15 |
| 2005/0068574 A1* | 3/2005 | Ferlitsch | 358/1.15 |
| 2005/0085229 A1 | 4/2005 | Yamaguchi | |
| 2006/0077456 A1 | 4/2006 | Aoki | |
| 2006/0149677 A1 | 7/2006 | Shahine et al. | |
| 2006/0259590 A1 | 11/2006 | Tsai et al. | |
| 2007/0240161 A1 | 10/2007 | Prabhakar et al. | |
| 2008/0004075 A1 | 1/2008 | Horton | |
| 2008/0316521 A1 | 12/2008 | Lesage et al. | |
| 2009/0043857 A1 | 2/2009 | Ferlitsch | |
| 2009/0089109 A1 | 4/2009 | Rabetge et al. | |
| 2009/0125612 A1 | 5/2009 | Rabetge et al. | |
| 2009/0150417 A1 | 6/2009 | Ghods et al. | |
| 2009/0177514 A1 | 7/2009 | Hudis et al. | |
| 2009/0282086 A1 | 11/2009 | Heimes | |
| 2009/0300511 A1 | 12/2009 | Behar et al. | |
| 2009/0303676 A1 | 12/2009 | Behar et al. | |
| 2009/0322790 A1 | 12/2009 | Behar et al. | |
| 2010/0036926 A1 | 2/2010 | Ahart et al. | |
| 2010/0228819 A1 | 9/2010 | Wei | |
| 2010/0229243 A1 | 9/2010 | Lin et al. | |
| 2010/0245888 A1 | 9/2010 | Nguyen et al. | |
| 2010/0250683 A1 | 9/2010 | Hoyne et al. | |
| 2010/0254375 A1 | 10/2010 | Feuerhahn et al. | |
| 2010/0265531 A1* | 10/2010 | Nitta | 358/1.14 |
| 2010/0269067 A1 | 10/2010 | De Bel Air et al. | |
| 2010/0302579 A1 | 12/2010 | Nuggehalli et al. | |
| 2010/0318609 A1 | 12/2010 | Lahiri et al. | |
| 2010/0332876 A1 | 12/2010 | Fields, Jr. et al. | |
| 2010/0333116 A1 | 12/2010 | Prahlad et al. | |
| 2011/0022812 A1 | 1/2011 | van der Linden et al. | |
| 2011/0058202 A1 | 3/2011 | St. Jacques, Jr. et al. | |
| 2011/0075199 A1 | 3/2011 | Jung et al. | |
| 2011/0087651 A1 | 4/2011 | Westin et al. | |
| 2011/0110373 A1 | 5/2011 | Ghosh et al. | |
| 2011/0119104 A1 | 5/2011 | Levine et al. | |
| 2011/0126197 A1 | 5/2011 | Larsen et al. | |
| 2011/0126207 A1 | 5/2011 | Wipfel et al. | |
| 2011/0153752 A1 | 6/2011 | Seaman | |
| 2011/0161973 A1 | 6/2011 | Klots et al. | |
| 2011/0167105 A1 | 7/2011 | Ramakrishnan et al. | |
| 2011/0188063 A1 | 8/2011 | Nuggehalli et al. | |
| 2011/0246817 A1 | 10/2011 | Orsini et al. | |
| 2011/0265169 A1 | 10/2011 | Bauer-Hermann et al. | |
| 2011/0314528 A1 | 12/2011 | Dolin | |
| 2012/0036048 A1 | 2/2012 | Robb et al. | |
| 2012/0072723 A1 | 3/2012 | Orsini et al. | |
| 2012/0081741 A1* | 4/2012 | Iida | 358/1.15 |
| 2012/0084365 A1 | 4/2012 | McCann | |
| 2012/0092723 A1 | 4/2012 | Jaudon et al. | |
| 2012/0134355 A1 | 5/2012 | Vendrow et al. | |
| 2012/0147420 A1 | 6/2012 | Nishimi et al. | |
| 2012/0158821 A1 | 6/2012 | Barros | |
| 2012/0166576 A1 | 6/2012 | Orsini et al. | |
| 2012/0166616 A1 | 6/2012 | Meehan et al. | |
| 2012/0232973 A1 | 9/2012 | Robb et al. | |
| 2012/0233315 A1 | 9/2012 | Hoffman et al. | |
| 2012/0240135 A1 | 9/2012 | Risbood et al. | |
| 2012/0246012 A1 | 9/2012 | Gower et al. | |
| 2012/0317132 A1 | 12/2012 | Brady et al. | |
| 2013/0117678 A1 | 5/2013 | Sun et al. | |
| 2013/0166712 A1 | 6/2013 | Chandramouli et al. | |
| 2013/0173916 A1 | 7/2013 | Sato | |
| 2013/0185364 A1 | 7/2013 | Bhatia | |
| 2013/0275973 A1 | 10/2013 | Greenfield et al. | |
| 2013/0290477 A1 | 10/2013 | Lesage | |
| 2014/0006355 A1 | 1/2014 | Kirihata | |
| 2014/0078542 A1* | 3/2014 | Murayama | 358/1.14 |
| 2014/0153048 A1* | 6/2014 | Sugiyama | 358/1.15 |
| 2015/0036174 A1* | 2/2015 | Pettis et al. | 358/1.15 |

FOREIGN PATENT DOCUMENTS

| | | |
|---|---|---|
| CN | 102143228 A | 8/2011 |
| JP | 2006094176 A | 4/2006 |
| WO | WO-2013065056 | 10/2013 |

OTHER PUBLICATIONS

Frogmore Computer Services Ltd, "Print your emails automatically with Mail Print," Oct. 12, 2011, <http://web.archive.org/web/20111012133925/http://www.frogmorecs.com/mailprint>.

Paperact, "White Paper—Scan Directly to the Cloud," Aug. 2011, 3 pages, available at http://www.paperact.com/wp_stage/wp-content/uploads/2011/08/White-Paper-PaperAct-Scan-to-Cloud.pdf.

Reider, L. et al., "Turn Document Scanners into Scan-to-cloud Workstations," (Web Page), May 25, 2011, 2 pages, available at http://officeproductnews.net/blogs/sara/turn_document_scanners_scan_to_cloud_workstations.

Srivastava, M., "OfficeDrop Offers Free Mac Scan-to-Cloud App and Updates Paid MAC App," Sep. 1, 2011, 2 pages, available at http://it.tmcnet.com/topics/it/articles/214193-officedrop-offers-free-mac-scan-to-cloud-app.htm.

Frogmore Computer Services Ltd., "Print Your Emails Automatically with Mail Print," Frogmore Software for Printing, Copyright 1998-2011 Frogmore Computer Services Ltd., 4 p. [Online] http://www.frogmorecs.com/mailprint.

Hewlett-Packard Development Company, L.P., "Help and Tips," May 7, 2011, <http://web.archive.org/web/20110507090937/http://h30495.www3.hp.com/help?>.

Wikipedia, "HP ePrint," Oct. 16, 2011, <http://web.archive.org/web/20111016081246/http://en.wikipedia.org/wiki/HP_ePrint>.

George Mikolay, "Services 'The Buzz' at Ricoh's Dealer Show, Host of New Products Announced," Jun. 6, 2011, Buyer's Lab, <http://www.buyerslab.com/news/viewarticle.asp?article=75840>.

Ricoh Americas Corporation, "Print Cloud User's Guide," 2011, ver. 1.4, <http://www.ricoh-cloud.com/files/PrintCloud_UserGuide_1.7.pdf>.

Soonr Workplace, "Print Cloud," Jul. 29, 2011, <https://www.youtube.com/watch?v=99Lsuj8T4N8>.

Wikipedia, "Image scanner," Sep. 30, 2011, <http://en.wikipedia.org/w/index.php?title=Image_scanner&oldid=453210700>.

* cited by examiner

RENDERING PERMISSIONS FOR RENDERING CONTENT

BACKGROUND

There exist many types of content (document types, file types, etc.) that people desire to display (e.g., on a computing device) and/or print. To display and/or print content, data associated with the content is rendered, typically, by an application. For example, word processing documents, spreadsheets, graphic images, etc. all contain data that, when rendered by an appropriate application, can be displayed on a computing device or rasterized for printing by a printing device.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also no necessarily mutually exclusive.

DETAILED DESCRIPTION

Embodiments described herein relate to systems, methods, and processes for rendering content, including remote rendering. Rendering generally refers to generating an image (e.g., for display) from a set of data. Remote or cloud rendering occurs when content is sent over a network for rendering by a network-connected device (e.g., server). For the purposes of clarity and simplicity herein, the term rendering is used to encompass all types of rendering, including remote or cloud rendering.

In view of the wide variety of content types (e.g. documents, spreadsheets, presentation slides, images, graphics, etc.), there are also a wide variety of applications for rendering the different types of content. In many cases, there are multiple different applications capable of rendering the same content. Not all applications render the same content equally, however. For example, certain types of content have native applications specifically designed to render the content. While other applications might also be capable of rendering the content, the native application for a particular type of content may render content more accurately or in a way that is more visually pleasing to a user.

In various embodiments, a rendering system is capable of rendering many different types of content. As such, the rendering system has many different applications available for use in rendering content of different types. Embodiments described herein facilitate selection of a rendering path based on the type of content and based on rendering permissions associated with the user requesting the rendering.

Figure 1:
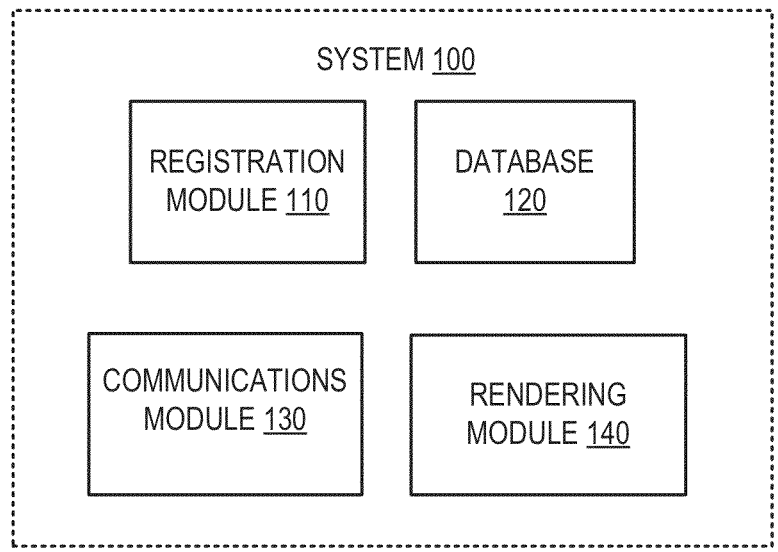
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As illustrated by the dotted line around system 100, the modules and components of system 100 may be integrated into a single physical computing device or they may be physically distributed among multiple computing devices connected, for example, over a network. In various embodiments, system 100 implements a printing service. Registration module 110 registers a user with system 100. As part of the user registration, the registration module 110 allows the user to connect and register one or more image forming devices (e.g., printers) with the printing service. The printing service may provide a web interface (e.g., a website) for a user to access user account information, update user preferences and/or permissions, initiate print requests, etc. In particular, registration module 110 receives a user selection of rendering permissions. Or, absent a user selection of rendering permissions, registration module 110 assigns default rendering permissions to the user. Database 120 stores user details (e.g. account information, etc.) including rendering permissions.

A communications module 130 receives print requests from registered users over a network. As used herein, a print request refers to a request for content to be printed. While embodiments described herein are directed to print requests, other types of requests could be handled in alternate embodiments. For example, content could be rendered for display and sent to a display device instead of printing the content.

In response to receiving a print request, system 100 determines the identity of the user sending the request and queries database 120 for rendering permissions associated with the user. Given the rendering permissions, rendering module 140 renders content received with the print request. In various embodiments, if the user's permissions are such that multiple applications are accessible for rendering the content, rendering module 140 selects the most preferable application for rendering the content. As used herein, the hierarchy of applications from preferred to non-preferred may be determined by a pre-defined mapping of preferences for content of different types. Such a mapping could be a default system mapping or it could be defined by the user. In certain embodiments, the print request may include a specific user-selected preference for rendering the content, which, if permitted in view of the rendering permissions, could override stored hierarchical preferences.

Figure 2:
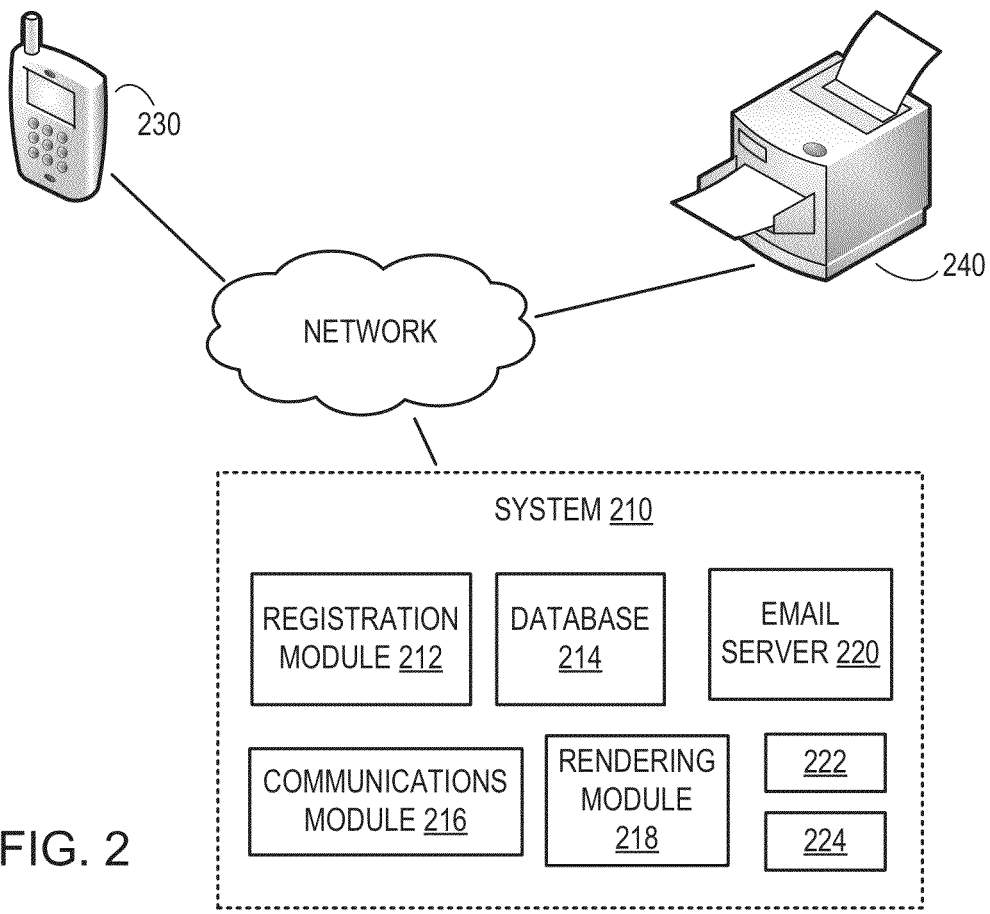
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. Various modules and/or components illustrated in FIG. 2 may be implemented as a computer-readable storage medium containing instructions executed by a processor (e.g., processor 222) and stored in a memory (e.g., memory 224) for performing the operations and functions discussed herein.

As illustrated by the dotted line around system 210, the modules and components of system 210 may be integrated into a single physical computing device or they may be physically distributed among multiple computing devices connected, for example, over a network. A user registers with system 210 via a web interface (e.g., a web page) from a computing device (e.g., smartphone 230, notebook, tablet, desktop, or other computing device capable of accessing the Internet). As part of the user registration, the registration module 212 allows the user to connect and register one or more image forming devices (e.g., printer 240) with the printing service. In addition to enabling user registration, the web interface allows the user to access user account information, update user preferences and/or permissions, link additional devices, initiate print requests, etc.

In particular, registration module 212 facilitates management of rendering permissions for users of the printing service. In various embodiments, rendering permissions are organized into three tiers. More tiers, fewer tiers or no tiers could be used in other embodiments. In an example of a three tier system, the tiers could be a "free user" tier, a "paid user" tier, and a "premium user" tier. Each tier allows rendering module 218 to access a set of one or more applications for rendering content. For example, if a user is registered as a "paid user" and desires to print a Microsoft Word® document (available from Microsoft Corporation of Redmond, Wash.), system 210 might allow rendering module 218 to use the official Microsoft Word® application to render the content. If, however, the user is not a "paid user" but, rather, a "free user," then system 210 might deny access to Microsoft Word® but allow access to Open Office Writer (available from the Apache Software Foundation of Forest Hill, Md.) to render the document.

Extending the above example further, each rendering tier may include a collection of applications for rendering different types of content. For example, the "free user" rendering tier might include the suite of Open Office applications for rendering word processing documents, spreadsheets, presentation slides, graphics files, etc. A "paid user" tier might include access to the suite of Microsoft Office® applications. A "premium" tier might include access to other additional applications, including specialty applications, such as Adobe Photoshop®, available from Adobe Systems of Mountain View, Calif.

In various embodiments, access to the rendering tiers is cumulative. In other words, a "premium user" has access to all of the applications available to the "paid user" and the "free user." Access to a particular rendering tier may be based on a paid subscription or other access mechanism. For example, a user may access the "free user" tier simply by registering. The "paid user" tier may be accessible in conjunction with a paid subscription to the service or with a pay-as-you-print mechanism. The "premium user" tier may be accessible with a higher subscription payment or other payment mechanism. Other access mechanisms might include earning tokens and/or points for access to different rendering tiers based on usage. For example, instead of a paid subscription, a user who prints 100 documents per month might receive access to a higher rendering tier than a user who only prints 10 documents per month.

In certain embodiments, rendering tiers can be customizable. For example, each application might have an individual cost (e.g., monetary, tokens, usage-based, etc.) and each user can create a custom package of applications to address their rendering needs. Further, rendering permissions can be managed on an individual basis for each type of content, without the need for tiered packages.

Whatever the rendering permissions negotiated between the user and registration module 212, these permissions are maintained and/or stored in database 214. Communications module 216 receives print requests from registered users over a network. Requests may be received via web interface (e.g., Hypertext Transfer Protocol (HTTP), HTTPS, etc.), email, or other suitable communication protocol. In the case of email, email server 220 receives an email print request from a user (e.g. with an attachment to be printed). Based on the sender's email address or other identifying information, system 210 accesses database 214 to determine the rendering permissions for the print request. Rendering module 218 proceeds to render the content from the print request based on the content type (e.g., word processing document versus spreadsheet, etc.) and in view of the rendering permissions. In various embodiments, the default is to use the "best" application available for rendering the content. However, in certain embodiments, the user may be able to override the default by request, assuming the user's rendering permissions allow it.

In an example, a user sends a print request to system 210 with a Word® document attached. If the user is determined to be "free user," the rendering permissions may allow rendering using Open Office Writer but not Microsoft Word®. However, in such instances communications module 216 may send a notification to the user that a better rendering option is available and offer the user an opportunity to upgrade his/her permissions (either for this one print job or for the user account generally). The user may agree to the permissions upgrade and provide authorization for the upgrade by responding to the notification (e.g., via email or web interface). For example, database 214 may maintain credit card and/or bank account information for the user. Thus, user authorization for the upgrade could allow registration module 212 to charge the upgrade against the user's account. Once registration module 212 confirms approval of the upgrade, rendering module 218 is notified and proceeds to render the Word® document using Microsoft Word based on the upgraded rendering permissions.

Figure 3:
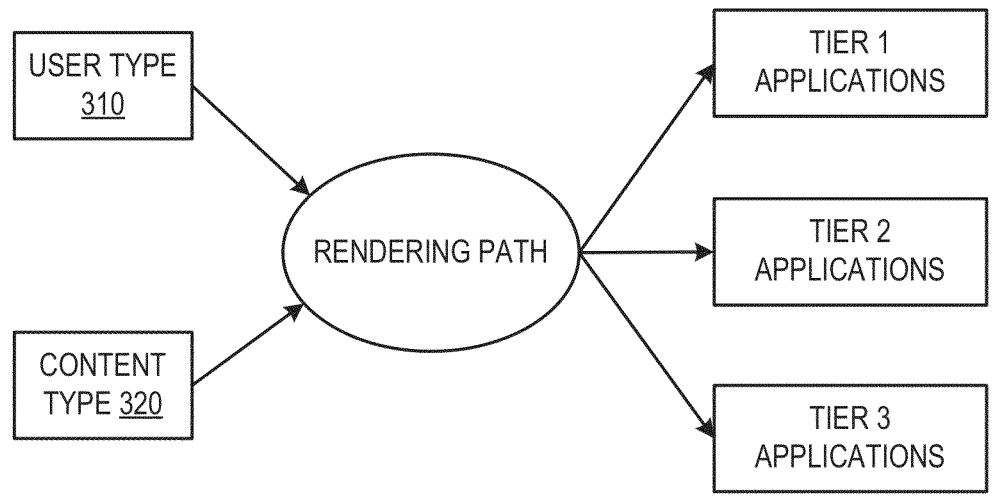
FIG. 3 is a block diagram illustrating a rendering path according to various embodiments.

FIG. 3 is a flow diagram illustrating an example of a rendering path. In various embodiments, the rendering path for a given print request or rendering request is determined by the user type 310 and the content type 320. The content type dictates what type of application to use in rendering the content associated with the request. For example, if the content includes data for a spreadsheet, then the content type is "spreadsheet" and an application that is capable of rendering spreadsheets will be desired. To determine which, if any, spreadsheet applications are available for rendering the spreadsheet data, the user type needs to be determined.

In various embodiments, the user type may correspond to one of a plurality of tiered categories (e.g., free user, paid user, premium user, etc.). In certain embodiments, rendering of certain content types may be restricted to certain rendering tiers. For example, certain content types may necessitate access to "tier 1" applications. If the user type does not permit access to "tier 1" applications, then the content from the request may not be rendered. If each of the rendering tiers has an option for rendering a particular content type, but the user type only allows access to "tier 2" and "tier 3" applications, then a compatible "tier 2" application might be used to render content from the request.

Figure 4:
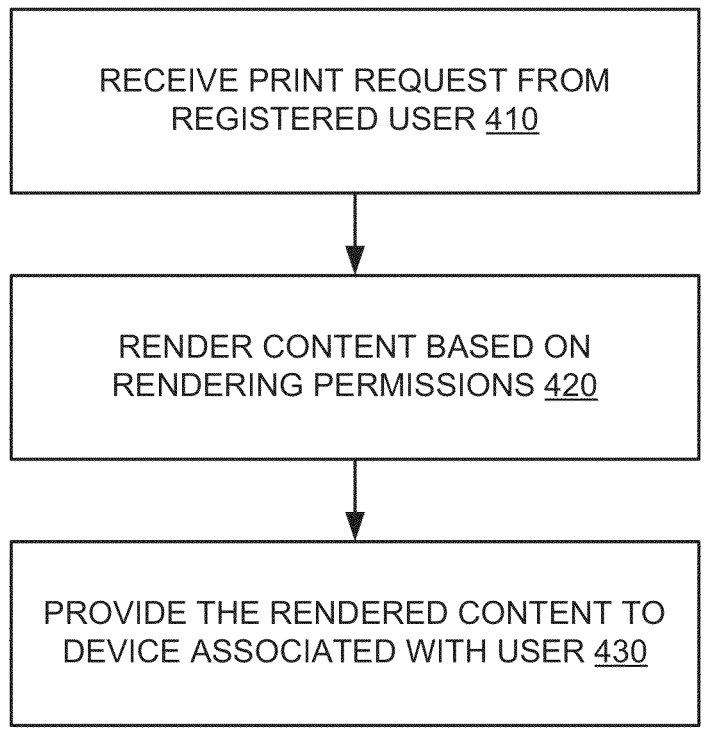
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A system receives 410 a print request over a network from a registered user of the system. The print request could be received via HTTP, HTTPS, email, or other suitable communications protocol. In various embodiments, the print request includes content to be printed and/or a reference (e.g., a web link) to content to be printed. The system renders 420 content associated with the print request based at least in part on rendering permissions associated with the user. If the system is capable of handling different types of content (e.g., different content types such as spreadsheets, presentation slides, graphics files, etc.), then the system may additionally use content type to determine how to render the content.

The system provides 430 rendered content over the network to a device associated with the registered user. For example, the ePrint Center (ePC), available from the Hewlett Packard Company of Palo Alto, Calif., allows a user to register with ePC and link a network-connected printing device to the user's ePC account. Thus, when the user sends a print request, the ePC system processes the request, including rendering (and possibly rasterizing) content from the request. ePC sends the processed content to a network-connected printer inked to the user who sent the request.

Figure 5:
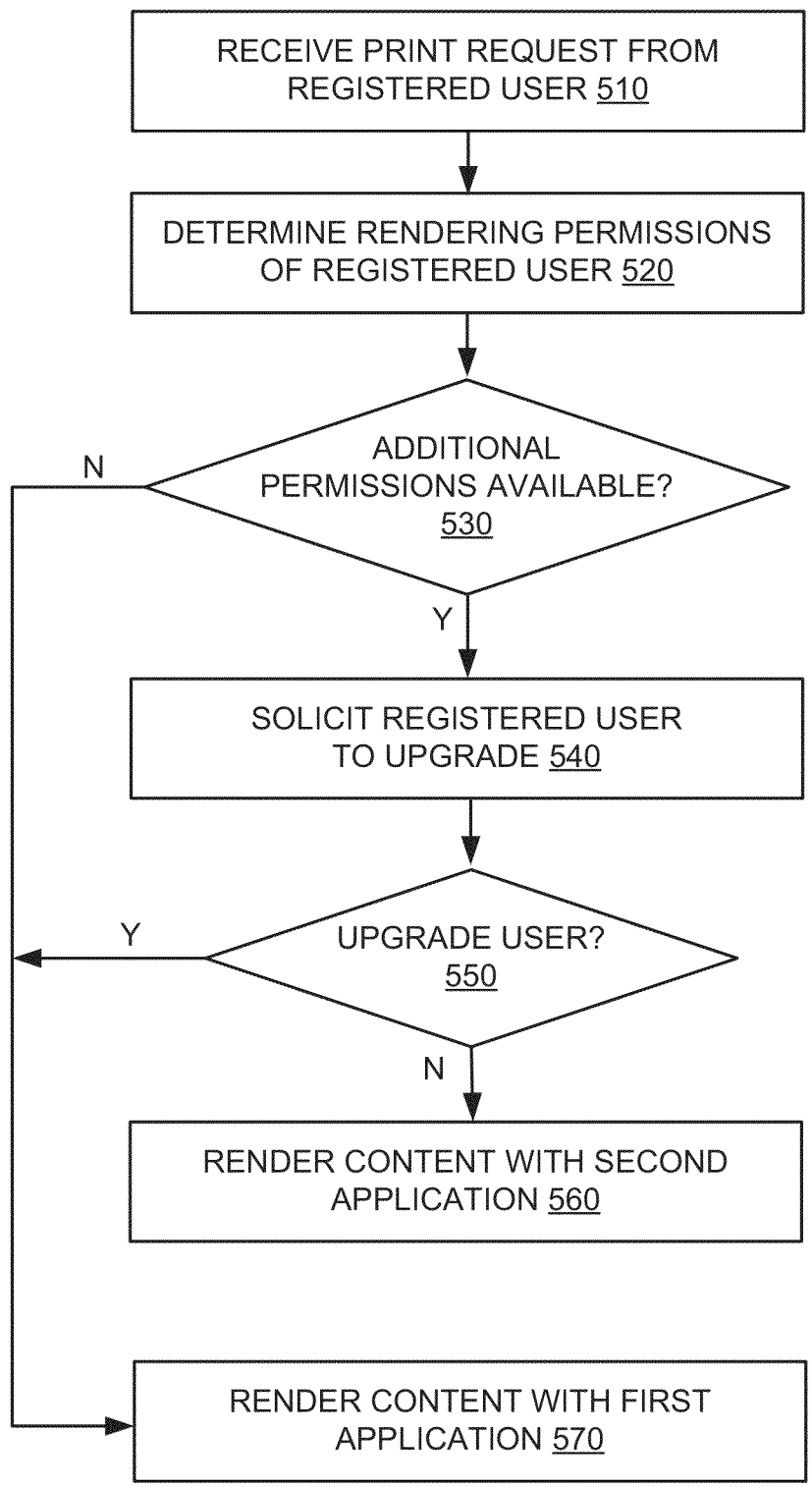
FIG. 5 is a flow diagram of operation in a system according to various embodiments.

FIG. 5 is a flow diagram of operation in a system according to various embodiments. FIG. 5 includes particular operations and execution order according to certain embodiments. However, in different embodiments, other operations, omitting one or more of the depicted operations, and/or proceeding in other orders of execution may also be used according to teachings described herein.

A system receives 510 a print request over a network from a registered user of the system. The print request could be received via HTTP, HTTPS, email, or other suitable communications protocol. In various embodiments, the print request includes content to be printed and/or a reference (e.g., a web link) to content to be printed. The system determines 420 the rendering permissions for the registered user in view of the content for the print request. If additional permissions are available 530, the registered user is solicited 540 to upgrade. The availability of additional permissions may signify that a better rendering option for the print request content is available. If no additional permissions are available 530, this may signify that the user already has access to the preferred available rendering option. As such, the content is rendered 570 using a first (e.g., preferred) application for rendering.

If, in response to the upgrade solicitation 540, the user responds with a request 550 to upgrade (e.g., including monetary payment or other validating token), then the system proceeds to grant access to the first (e.g., preferred) application and renders 570 the content using the first application. If, in response to the upgrade solicitation 540, the user does not request 550 an upgrade of rendering permissions, then the system proceeds to render the content with a second application (i.e., suitable for rendering the content but perhaps less preferred than the first application).

Various modifications may be made to the disclosed embodiments and implementations of the invention without departing from their scope. Therefore, the illustrations and examples herein should be construed in an illustrative, and not a restrictive sense.

What is claimed is:

1. A method, comprising:
receiving, via network connection, a print request from a registered user of a network-connected printer;
determining applications capable of rendering content associated with the print request based at least in part on a content type for the content;
selecting an application from among the applications capable of rendering the content based at least in part on rendering permissions associated with the registered user;
rendering content associated with the print request; and
providing, via network connection, the rendered content to a device associated with the registered user.

2. The method of claim 1, wherein rendering content based at least in part on rendering permissions comprises:
rendering the content with a first application if allowed in view of the rendering permissions; otherwise
rendering the content with a second application or discarding the print request.

3. The method of claim 1, further comprising:
prior to rendering, determining that rendering permissions for the registered user prevent rendering with a first application but allow rendering with a second application;
soliciting the registered user to have content rendered with the first application;
receiving input from the registered user to add rendering permissions, including permissions to render content with the first application; and
rendering content for the print request with the first application in view of the added rendering permissions.

4. The method of claim 3, wherein receiving input to add rendering permissions comprises:
receiving payment or verification of payment for the added rendering permissions.

5. The method of claim 1, wherein rendering content is further based at least in part on a content type of the print request.

6. A non-transitory computer-readable storage medium containing instructions that, when executed, cause a computer to:
register a user with a printing service;
associate a network-connected image forming device with the user;
associate the user with a first rendering tier from among a plurality of rendering tiers, each tier having one or more applications for rendering content;
receive an imaging request from the user;
determine, based on the first rendering tier associated with the user, an application for rendering content associated with the imaging request;
render content associated with the imaging request; and
provide the rendered content to the image forming device associated with the user.

7. The non-transitory computer-readable storage medium of claim 6, comprising further instructions that cause the computer to:
provide notification to the user of a second application capable of rendering content associated with the imaging request; and
associate the user with a second rendering tier in response to user input; and render content associated with the imaging request according to the second rendering tier.

8. The non-transitory computer-readable storage medium of claim 7, wherein the user input comprises payment or verification of payment.

9. The non-transitory computer-readable storage medium of claim 6, wherein the instructions that cause the rendering comprise further instructions that cause the computer to:
render content based at least in part on a content type associated with the imaging request.

10. A system, comprising:
a registration module to register a user with a printing service;
a database to store user details including rendering permissions associated with the user;
a communications module to receive a print request from a user over a network; and
a rendering module to:
determine applications capable of rendering content associated with the print request based at least in part on a content type for the content;
select an application from among the applications capable of rendering the content according to rendering permissions associated with the user; and
render content from the print request.

11. The system of claim 10, the communications module further to provide rendered content over a network to a printing device associated with the user.

12. The system of claim 10, the communications module further to:
notify the user over the network of other applications capable of rendering content associated with the print request; and
the registration module to change rendering permissions for the user in response to the communications module receiving an indication of a qualified token authorizing the change in rendering permissions.

* * * * *

UNITED STATES PATENT AND TRADEMARK OFFICE
CERTIFICATE OF CORRECTION

| | |
|---|---|
| PATENT NO. | : 9,141,887 B2 |
| APPLICATION NO. | : 14/354297 |
| DATED | : September 22, 2015 |
| INVENTOR(S) | : Suraj Sarangamath |

It is certified that error appears in the above-identified patent and that said Letters Patent is hereby corrected as shown below:

Title page, item (75), Inventors, in column 1, line 2, delete "Karnatka" and insert -- Karnataka --, therefor.

Signed and Sealed this
Fourteenth Day of June, 2016

Michelle K. Lee
*Director of the United States Patent and Trademark Office*